(12) United States Patent
Lin et al.

(10) Patent No.: US 12,379,704 B2
(45) Date of Patent: Aug. 5, 2025

(54) CONTROLLER FOR CONTROLLING ELECTRIC MOTOR MODULE EQUIPPED WITH INCREMENTAL ENCODER AND OPERATION METHOD THEREOF

(71) Applicant: Artery Technology Company, Hsinchu (TW)

(72) Inventors: Ming-Tsan Lin, Keelung (TW); Yi-Shiang Ouyang, Miaoli County (TW); Zi-Xuan Huang, Nantou County (TW)

(73) Assignee: ARTERY TECHNOLOGY COMPANY, Hsinchu (TW)

( * ) Notice: Subject to any disclaimer, the term of this patent is extended or adjusted under 35 U.S.C. 154(b) by 167 days.

(21) Appl. No.: 18/232,824

(22) Filed: Aug. 11, 2023

(65) Prior Publication Data

US 2024/0103480 A1  Mar. 28, 2024

(30) Foreign Application Priority Data

Sep. 28, 2022  (CN) .......................... 202211193606.2

(51) Int. Cl.
G05B 19/21 (2006.01)
H02P 21/18 (2016.01)
H02P 21/34 (2016.01)

(52) U.S. Cl.
CPC .............. *G05B 19/21* (2013.01); *H02P 21/18* (2016.02); *H02P 21/34* (2016.02); *G05B 2219/33218* (2013.01)

(58) Field of Classification Search
CPC .......... G05B 19/21; G05B 2219/33218; G01D 18/001; H02P 21/34; H02P 21/18
See application file for complete search history.

(56) References Cited

U.S. PATENT DOCUMENTS 3,998,088 A * 12/1976 Kazangey ........... H03M 1/1071
341/11
5,038,243 A  8/1991 Gordon
(Continued)

FOREIGN PATENT DOCUMENTS

CN  111693075 B  5/2022
EP  1 555 748 A2  7/2005
(Continued)

*Primary Examiner* — Bickey Dhakal
(74) *Attorney, Agent, or Firm* — WPAT, P.C.; Anthony King (57) ABSTRACT

A controller for controlling an electric motor module equipped with incremental encoder and operation method thereof are provided. The controller includes a quadruple frequency circuit, a driver circuit, a non-volatile memory (NVM) and a multi-phase control circuit. The multi-phase control circuit can perform multi-phase control with aid of the NVM, for example: reading an offset counter value from the NVM; executing an initial angle estimation procedure, generating an initial counter value according to an estimated initial angle and the offset counter value, and starting utilizing the driver circuit to directly control the electric motor to start with the estimated initial angle and utilizing a counter to perform counting operations; calculating a counter value error and clear the current counter value to be zero; and performing compensation corresponding to a predetermined compensation times count according to the counter value error, respectively, to control the rotor to reach a target angle.

20 Claims, 9 Drawing Sheets

(56) References Cited

U.S. PATENT DOCUMENTS

| | | | |
|---|---|---|---|
| 5,121,327 A * | 6/1992 | Salazar | G07B 17/00508 |
| | | | 318/696 |
| 6,914,543 B2 | 7/2005 | Floros | |
| 11,356,044 B2 | 6/2022 | Wang | |
| 2011/0248659 A1 | 10/2011 | Balazovic | |
| 2016/0320205 A1* | 11/2016 | Li | H02P 31/00 |
| 2018/0262140 A1 | 9/2018 | Lee | |
| 2019/0089282 A1 | 3/2019 | Goetting | |
| 2022/0140759 A1 | 5/2022 | Knezevic | |

FOREIGN PATENT DOCUMENTS

| | | | |
|---|---|---|---|
| EP | 3 686 559 A1 | | 7/2020 |
| JP | 2004108774 A | * | 4/2004 |
| TW | 240351 | | 2/1995 |
| TW | I371913 B1 | | 9/2012 |
| TW | I455474 B | | 10/2014 |
| TW | I570390 B | | 2/2017 |
| WO | 2010/072154 A1 | | 7/2010 |
| WO | 2019/059173 A1 | | 3/2019 |

* cited by examiner

CONTROLLER FOR CONTROLLING ELECTRIC MOTOR MODULE EQUIPPED WITH INCREMENTAL ENCODER AND OPERATION METHOD THEREOF

BACKGROUND OF THE INVENTION

1. Field of the Invention

The present invention is related to motor control, and more particularly, to a controller for controlling an electric motor module equipped with an incremental encoder and an operation method thereof.

2. Description of the Prior Art

According to the related art, an electric motor may be connected to an encoder, such as an absolute encoder or an incremental encoder, for performing precise control. The absolute encoder may indicate an absolute position or an absolute angle. In addition, the incremental encoder may report a position variation or an angle variation, etc., rather than the absolute position or the absolute angle, allowing the internal components of incremental encoder to be simpler and more cost-effective. However, certain problems may occur. For example, after the incremental encoder and the electric motor are integrated into an electric motor module, it is typically needed to calibrate the difference between the 0 degree of the rotor of the electric motor and the index angle indicated by the index signal, where the associated manual operations are complicated, therefore increasing the labor cost. During daily use, it may not be started directly for normal operations each time the power is turned on, since there is no absolute position or absolute angle of the rotor at this moment. Before the normal operations, it is needed to control the rotor to rotate to the above-mentioned index angle indicated by the index signal to prevent errors, and this is very inconvenient for the application of mechanical structures that cannot be arbitrarily rotated or moved at will when the power is turned on.

Some conventional methods have been proposed to try to solve the above-listed problems, but may cause some side effects such as additional problems. For example, a first conventional method suggests adding additional sensors to the incremental encoder to make different sensors correspond to encoding rings of different codes, but this particular design is not a universal structure, and the parsing of the starting angle is limited by the associated encoding resolution. A second conventional method suggests that at start-up, the initial angle of the rotor is determined based on the respective states of three additional sensors such as the U sensor, the V sensor, and the W sensor, and then some other operations are performed, but this particular design requires the three additional sensors mentioned above, and a maximum error of the initial angle may reach 30 degrees. A third conventional method suggests to estimate the possible initial angle of the rotor by detecting the associated signals of the rotor, and find out the most probable initial angle of the rotor by statistical methods, but the error of the estimated angle may be very large, and the rotor must be able to rotate freely and to rotate in a reverse direction, which means that this conventional method is not suitable for applications where mechanical structures cannot be rotated or moved at will when powered on. A fourth conventional method suggests to add multiple special gears to the incremental encoder to make these special gears be fully rotated when starting, thereby determining the relative position of these special gears to determine the absolute position or the absolute angle of the rotor, but this particular design requires the aforementioned multiple special gears, and the rotor must be able to rotate freely, which means this conventional method is not suitable for applications where mechanical structures cannot be rotated or moved at will when powered on. A fifth conventional method suggests adding one or more additional circuits such as one or more absolute position generating circuits and one or more additional structures such as one or more absolute position code discs to the incremental encoder, but this particular design requires the above-mentioned additional circuits and additional structures, making the overall structure become complex and making the cost increase correspondingly.

As described above, the above-listed conventional methods will bring their respective side effects such as additional problems and the like. Therefore, a novel architecture is needed for realizing a low-cost and robust electric motor control architecture without introducing any side effect or in a way that is less likely to introduce a side effect.

SUMMARY OF THE INVENTION

It is an objective of the present invention to provide a controller for controlling an electric motor module equipped with an incremental encoder and an operation method thereof, in order to solve the above-mentioned problems.

It is another objective of the present invention to provide a controller for controlling an electric motor module equipped with an incremental encoder and an operation method thereof, in order to realize a low-cost and robust electric motor control architecture without introducing any side effect or in a way that is less likely to introduce a side effect.

At least one embodiment of the present invention provides a controller for controlling an electric motor module equipped with an incremental encoder, where the electric motor module comprises an electric motor and the incremental encoder. The controller may comprise: a quadruple frequency circuit, coupled to the incremental encoder; a driver circuit, coupled to the electric motor; a non-volatile memory (NVM); and a multi-phase control circuit, coupled to the quadruple frequency circuit, the driver circuit and the non-volatile memory. For example, the quadruple frequency circuit may be arranged to generate a quadruple frequency signal according to a first output signal and a second output signal output by the incremental encoder, wherein the first output signal and the second output signal have the same frequency, and a phase difference between the first output signal and the second output signal is equal to a predetermined phase difference; the driver circuit may be arranged to generate at least one driving signal to drive the electric motor; the non-volatile memory may be arranged to store information; and the multi-phase control circuit may be arranged to perform multi-phase control corresponding to multiple phases with aid of the non-volatile memory, wherein the multiple phases comprise an automatic calibration phase and a direct start-up phase, and the multi-phase control circuit comprises a counter which is coupled to the quadruple frequency circuit. The counter may be arranged to receive the quadruple frequency signal as a clock signal and perform counting operations according to the clock signal in the automatic calibration phase and the direct start-up phase respectively, for controlling the electric motor module. In addition, operations corresponding to the direct start-up phase in the multi-phase control may comprise: reading an offset counter value from the non-volatile memory, wherein the offset counter value is obtained in the automatic calibration phase; executing an initial angle estimation procedure to obtain an estimated initial angle of a rotor in the electric motor, generating an initial counter value according to the estimated initial angle and the offset counter value, for being written into the counter, and starting utilizing the driver circuit to control the electric motor to directly start with the estimated initial angle and utilizing the counter to perform counting operations; in response to an index signal output by the incremental encoder being active, calculating a difference between a current counter value of the counter and the offset counter value to be a counter value error of the initial counter value, and clearing the current counter value of the counter to be zero; and performing compensation corresponding to a predetermined compensation times count according to the counter value error, respectively, to control the rotor to reach a target angle, wherein the predetermined compensation times count represents a predetermined number of times of compensation.

At least one embodiment of the present invention provides an operation method of a controller for controlling an electric motor module equipped with an incremental encoder, where the electric motor module comprising an electric motor and the incremental encoder. The operation method may comprise: utilizing a quadruple frequency circuit to generate a quadruple frequency signal according to a first output signal and a second output signal output by the incremental encoder, wherein the first output signal and the second output signal have the same frequency, and a phase difference between the first output signal and the second output signal is equal to a predetermined phase difference; utilizing a driver circuit to generate at least one driving signal to drive the electric motor; and utilizing a multi-phase control circuit to perform multi-phase control corresponding to multiple phases with aid of a non-volatile memory, wherein the multiple phases comprise an automatic calibration phase and a direct start-up phase, and a counter in the multi-phase control circuit is arranged to receive the quadruple frequency signal as a clock signal and perform counting operations according to the clock signal in the automatic calibration phase and the direct start-up phase respectively, for controlling the electric motor module. In addition, operations corresponding to the direct start-up phase in the multi-phase control may comprise: reading an offset counter value from the non-volatile memory, wherein the offset counter value is obtained in the automatic calibration phase; executing an initial angle estimation procedure to obtain an estimated initial angle of a rotor in the electric motor, generating an initial counter value according to the estimated initial angle and the offset counter value, for being written into the counter, and starting utilizing the driver circuit to control the electric motor to directly start with the estimated initial angle and utilizing the counter to perform counting operations; in response to an index signal output by the incremental encoder being active, calculating a difference between a current counter value of the counter and the offset counter value to be a counter value error of the initial counter value, and clearing the current counter value of the counter to be zero; and performing compensation corresponding to a predetermined compensation times count according to the counter value error, respectively, to control the rotor to reach a target angle, wherein the predetermined compensation times count represents a predetermined number of times of compensation.

One of the multiple advantages of the present invention is that the controller can achieve the near-absolute-encoder accuracy that is close to the accuracy of the absolute encoder while using a normal incremental encoder, having no need to design any special structure in the incremental encoder. In addition, the operations corresponding to the automatic calibration phase in the multi-phase control only needs to be performed once (for example, in the production and/or setup phases of the electric motor module, after the electric motor and the incremental encoder are connected to each other) to store the offset counter value into the non-volatile memory. Additionally, in the direct start-up phase, the controller can control the electric motor to start directly for normal operations, having no need to perform the rotor position initialization (for example, control the rotor to rotate to the above-mentioned index angle indicated by the index signal first), so it is suitable for various applications, and more particularly, the applications of mechanical structures that cannot be rotated or moved at will when powered on.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
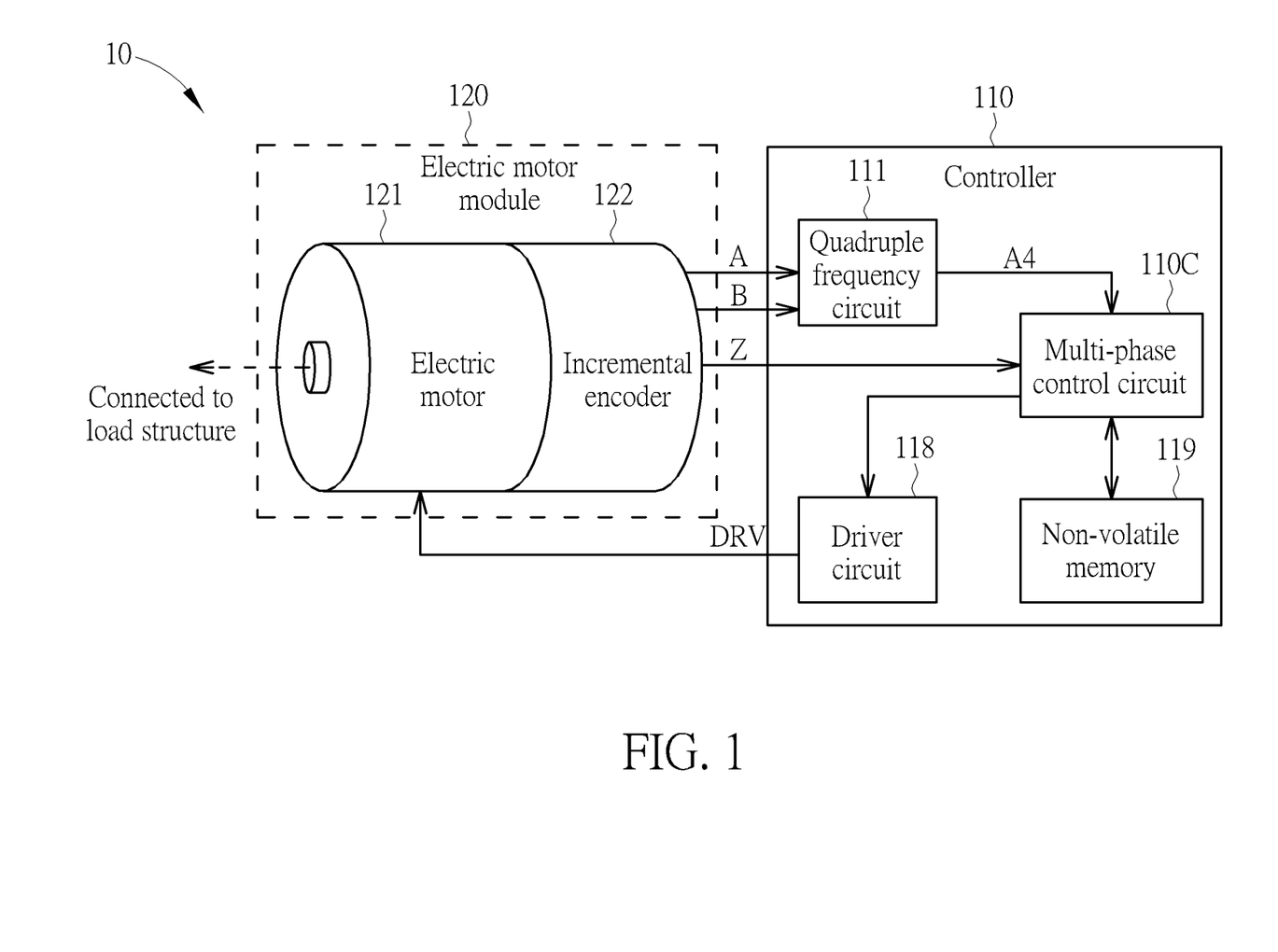
FIG. 1 is a diagram of an electric motor device according to an embodiment of the present invention, where the electric motor device comprises an electric motor module equipped with an incremental encoder and a controller for controlling the electric motor module equipped with the incremental encoder.

FIG. 1 is a diagram of an electric motor device 10 according to an embodiment of the present invention. The electric motor device 10 may comprise a controller 110 and an electric motor module 120, where the controller 110 may comprise a multi-phase control circuit 110C, a quadruple frequency circuit 111, a driver circuit 118 and a non-volatile memory 119, and the electric motor module 120 may comprise an electric motor 121 and an incremental encoder 122, where the quadruple frequency circuit 111 may also be referred to as the four-times frequency multiplier circuit according to some viewpoints, but the invention is not limited thereto. According to some embodiments, the quadruple frequency circuit 111 shown in FIG. 1 may be replaced with a quadrature decoder. In addition, the controller 110 may be arranged to control the electric motor module 120 equipped with the incremental encoder 122. For example, the electric motor 121 (or the rotor therein, not shown in FIG. 1) may be connected to a load structure such as any mechanical structure among various mechanical structures, to make the aforementioned any mechanical structure move and/or rotate to reach a target position under the control of the controller 110.

As shown in FIG. 1, the incremental encoder 122 may output a first output signal such as the output signal A, a second output signal such as the output signal B and an index signal Z to the controller 110. In the controller 110, the quadruple frequency circuit 111 may generate a quadruple frequency signal A4 (e.g., a four-times frequency multiplied signal) according to the first output signal and the second output signal output by the incremental encoder 122, such as the output signals A and B, where the output signals A and B may have the same frequency, the phase difference between the output signals A and B may be equal to a predetermined phase difference such as 90°, and the frequency of the quadruple frequency signal A4 may be four times the aforementioned same frequency of the output signals A and B, but the invention is not limited thereto. According to some embodiments, the quadruple frequency circuit 111 may generate at least one other signal (e.g., one or more other signals) such as a rotation direction signal according to the first output signal and the second output signal, such as the output signals A and B, to indicate the rotation direction of the rotor mentioned above, for the controller 110 (or the multi-phase control circuit 110C) to determine the angle of the rotor and perform the associated control. For example, the quadruple frequency circuit 111 may be implemented by way of a logic circuit, for detecting the respective rising and/or falling edges of the output signals A and B to generate the quadruple frequency signal A4, the aforementioned at least one other signal such as the rotation direction signal, etc. In a situation where the output signals A and B respectively have the same local waveforms as the waveforms of two clock signals of the same frequency and different phases (for example, during the rotation of the rotor), the quadruple frequency signal A4 may also have a similar waveform, whose frequency is four times the frequency of the two clock signals mentioned above. In addition, the driver circuit 118 may be arranged to generate at least one driving signal (e.g., one or more driving signals), which may be collectively referred to as the driving signal DRV, for driving the electric motor 121 for the controller 110, and the non-volatile memory 119 may be arranged to store information, and the multi-phase control circuit 110C may perform multi-phase control corresponding to multiple phases with the aid of the non-volatile memory 119, where the multiple phases may comprise an automatic calibration phase and a direct start-up phase. For example, the non-volatile memory 119 may be implemented by way of a flash memory, an electrically-erasable programmable read-only memory (EEPROM), etc., for storing multi-phase-control-related information (e.g., the information related to the multi-phase control) in the automatic calibration phase for the controller 110, and providing the multi-phase-control-related information in the direct start-up phase, to allow the multi-phase control circuit 110C to perform the multi-phase control according to the multi-phase control-related information.

Figure 2:
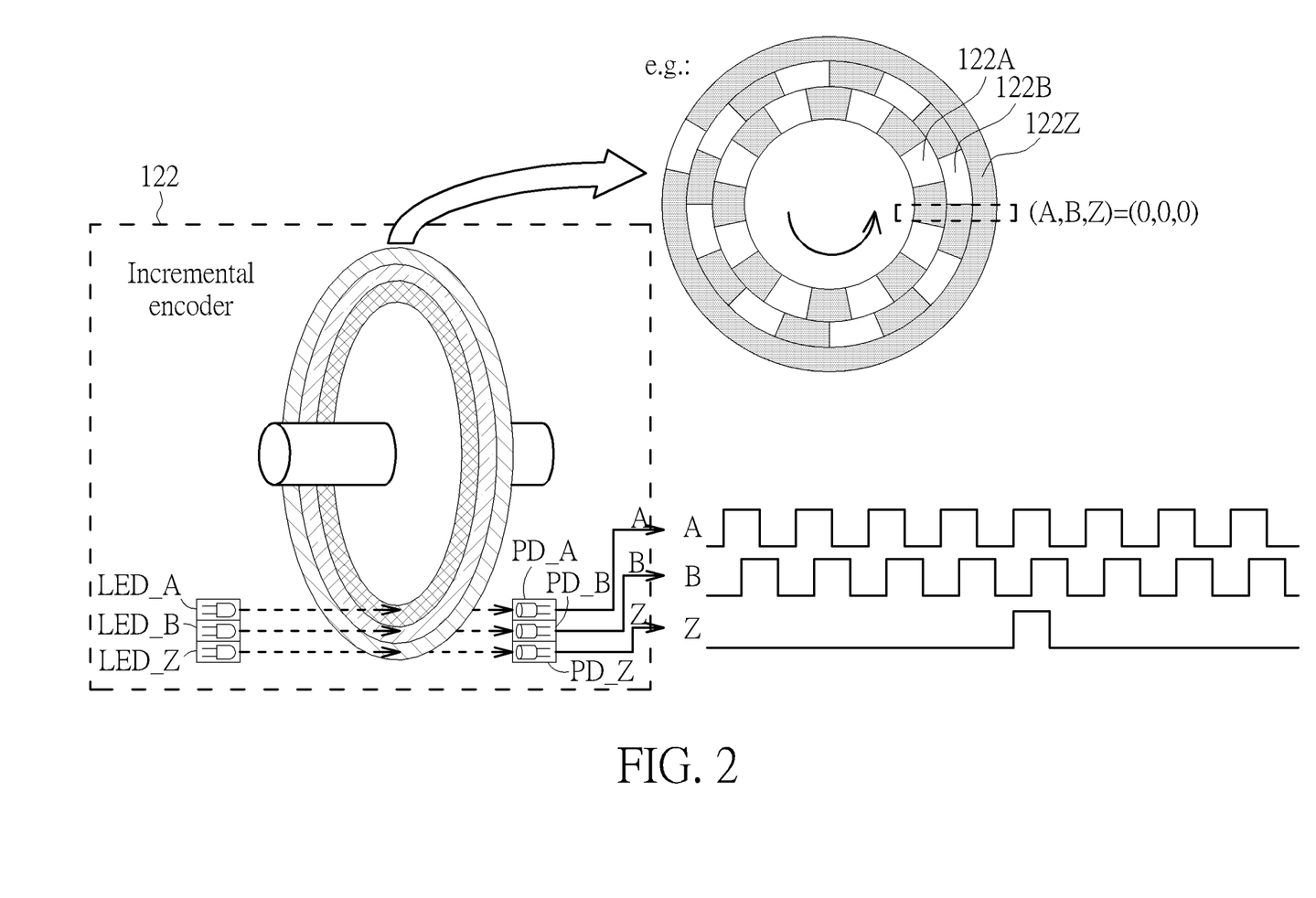
FIG. 2 illustrates some implementation details of the incremental encoder shown in FIG. 1 according to an embodiment of the present invention.

FIG. 2 illustrates some implementation details of the incremental encoder 122 shown in FIG. 1 according to an embodiment of the present invention. The incremental encoder 122 may comprise a set of light-emitting diodes (LEDs) such as the LEDs LED_A, LED_B and LED_Z respectively corresponding to the output signal A, the output signal B and the index signal Z, and comprise a set of photoelectric diodes (PDs) such as the PDs PD_A, PD_B and PD_Z respectively corresponding to the output signal A, the output signal B and the index signal Z, and more particularly, may further comprise a set of encoding rings such as the encoding rings 122A, 122B and 122Z respectively corresponding to the output signal A, the output signal B and the index signal Z. For example, the encoding rings 122A, 122B and 122Z may be implemented to have light-transmitting portions and non-light-transmitting portions corresponding to predetermined patterns, respectively, as shown in the upper right corner of FIG. 2, where the light-transmitting portions and the non-transparent part may make these signals (e.g., the output signal A, the output signal B and the index signal Z) have logic values 1 and 0, respectively, but the present invention is not limited thereto. In some other examples, the aforementioned predetermined patterns may vary, and the encoding rings 122A, 122B, and 122Z may vary accordingly.

According to some embodiments, the architecture shown in FIG. 2 may vary. For example, the set of PDs mentioned above may be replaced by a set of photo-transistors. For brevity, similar descriptions for these embodiments are not repeated in detail here.

Figure 3:
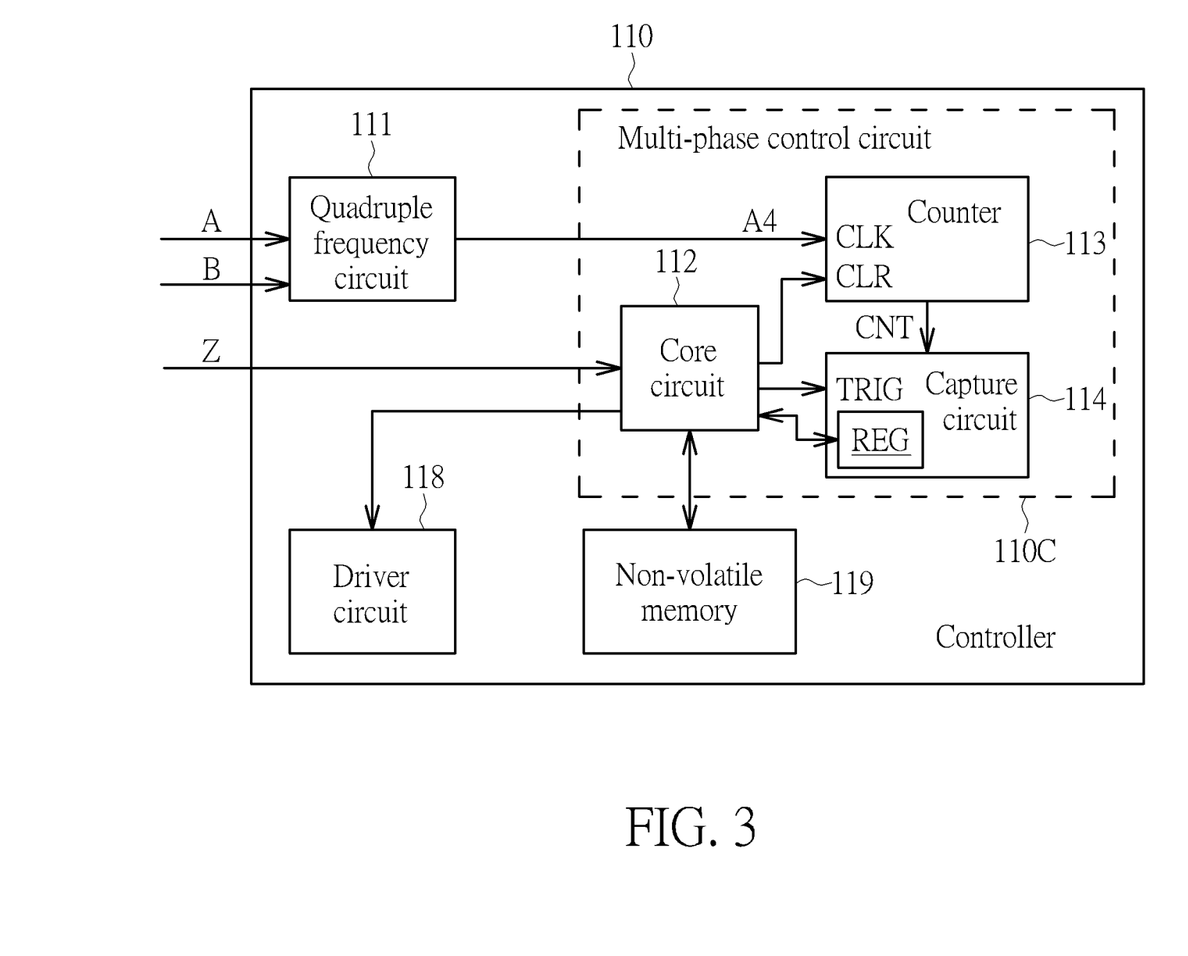
FIG. 3 illustrates some implementation details of the controller shown in FIG. 1 according to an embodiment of the present invention.

FIG. 3 illustrates some implementation details of the controller 110 shown in FIG. 1 according to an embodiment of the present invention. The multi-phase control circuit 110C may comprise a core circuit 112, a counter 113 and a capture circuit 114, where the counter 113 is coupled to the quadruple frequency circuit 111. The core circuit 112 may control the operations of the controller 110 (or other components therein), and more particularly, may control the operations of the multi-phase control circuit 110C (or the counter 113 and the capture circuit 114 therein). Under the control of the core circuit 112, the counter 113 may be arranged to receive the quadruple frequency signal A4 (for example, by utilizing the clock terminal CLK of the counter 113) as a clock signal of the counter 113 and perform counting operations according to the clock signal in the automatic calibration phase and the direct start-up phase respectively, for controlling the electric motor module 120, but the invention is not limited thereto. In a situation where the frequency quadruple circuit 111 generates the above-mentioned rotation direction signal according to the output signals A and B to indicate the rotation direction of the rotor mentioned above, the counter 113 may perform counting operations such as count-up operations and/or count-down operations according to the clock signal and the rotation direction signal, for controlling the electric motor module 120, wherein: when the above-mentioned rotation direction signal indicates that the rotation direction is equal to a first predetermined rotation direction, the counter 113 may perform an count-up operation; and when the above-mentioned rotation direction signal indicates that the rotation direction is equal to a second predetermined rotation direction such as the opposite direction of the first predetermined rotation direction, the counter 113 may perform a count-down operation. In addition, the capture circuit 114 may comprise at least one storage unit (e.g., one or more storage units) such as at least one register (e.g., one or more registers), which may be collectively referred to as the register REG. Under the control of the core circuit 112, the capture circuit 114 may capture the counter value CNT of the counter 113, and utilize the register REG to record the captured counter value CNT, where this capture operation may be performed in response to a signal (or a predetermined logic value of this signal, such as the logic value 1) received by the trigger terminal TRIG of the capture circuit 114. When there is a need, the core circuit 112 may clear any counter value CNT of the counter 113 to be zero, where this clearing operation may be performed in response to a signal (or a predetermined logic value of this signal, such as the logic value 1) received by the clear terminal CLR of the counter 113.

Figure 4:
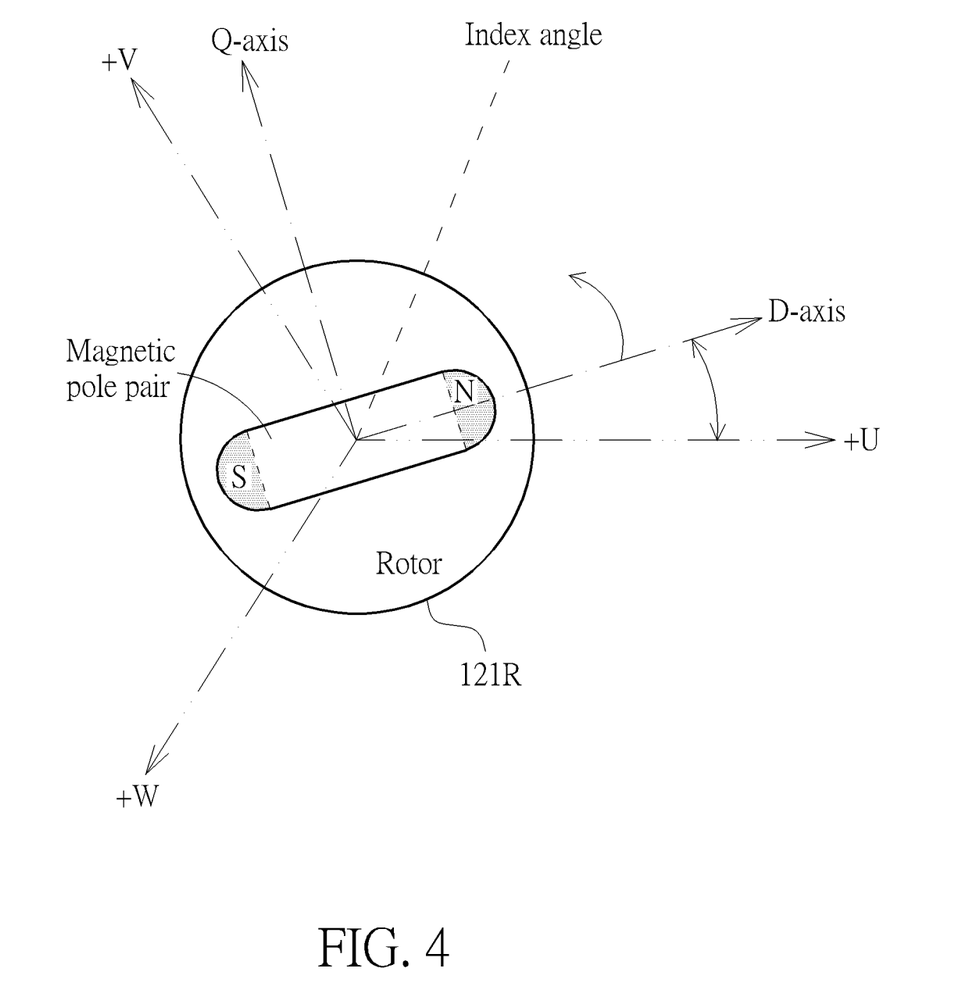
FIG. 4 illustrates associated magnetic poles of the rotor in the electric motor shown in FIG. 1 according to an embodiment of the present invention.

FIG. 4 illustrates the associated magnet/magnetic poles of the rotor 121R in the electric motor 121 shown in FIG. 1 according to an embodiment of the present invention. The rotor 121R may comprise at least one magnetic pole pair (e.g., one or more magnetic pole pairs), such as a magnetic pole pair formed by a magnetic pole N and a magnetic pole S as shown in FIG. 4, where the magnetic flux direction of this magnetic pole pair at this magnetic pole N may be defined as the D-axis and the direction 90 degrees ahead of the D-axis may be defined as the Q-axis, but the present invention is not limited thereto. In addition, the electric motor 121 may comprise three-phase coils such as coils corresponding to three phases, and the respective unit vectors of the three phases may be aligned to the +U axis, the +V axis and the +W axis in a predetermined space, where the phase difference between any two axes among the +U axis, the +V axis and the +W axis may be equal to 120°, but the present invention is not limited thereto. Additionally, in an ideal case, when the D-axis is aligned to the +U axis, the index signal Z is just active, where the D-axis and the index angle indicated by the index signal Z are aligned to the +U-axis at the same time. However, in a real case, the D-axis and the index angle indicated by the index signal Z are typically not aligned to the +U axis at the same time.

Figure 5:
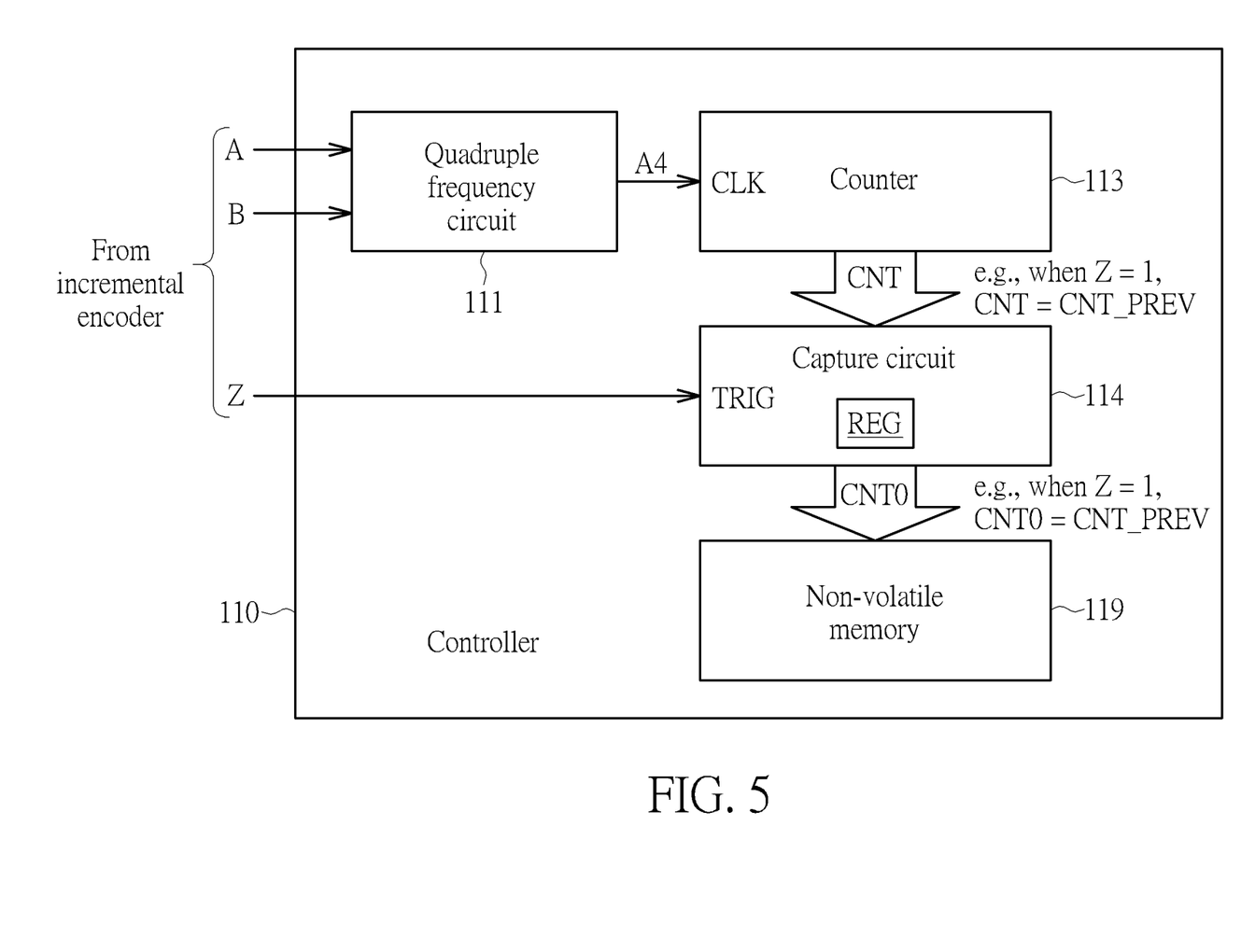
FIG. 5 illustrates associated operations of the controller shown in FIG. 1 in the automatic calibration phase according to an embodiment of the present invention.

FIG. 5 illustrates the associated operations of the controller 110 shown in FIG. 1 in the automatic calibration phase according to an embodiment of the present invention, where the offset counter value CNT0 may be taken as an example of the multi-phase-control-related information mentioned above. Under the control of the core circuit 112, the capture circuit 114 may capture the counter value CNT of the counter 113 as the offset counter value CNT0 in response to the index signal Z (or a predetermined logic value of the index signal Z, such as the logic value 1), and utilize the register REG to record the captured offset counter value CNT0, for being stored in the non-volatile memory 119. For example, when the index signal Z is active (e.g., Z=1), the counter value CNT output by the counter 113 may be equal to a certain previous counter value CNT_PREV (labeled "CNT=CNT_PREV" for brevity), and the offset counter value CNT0 may also be equal to this previous counter value CNT_PREV (labeled "CNT0=CNT_PREV" for brevity).

Figure 6:
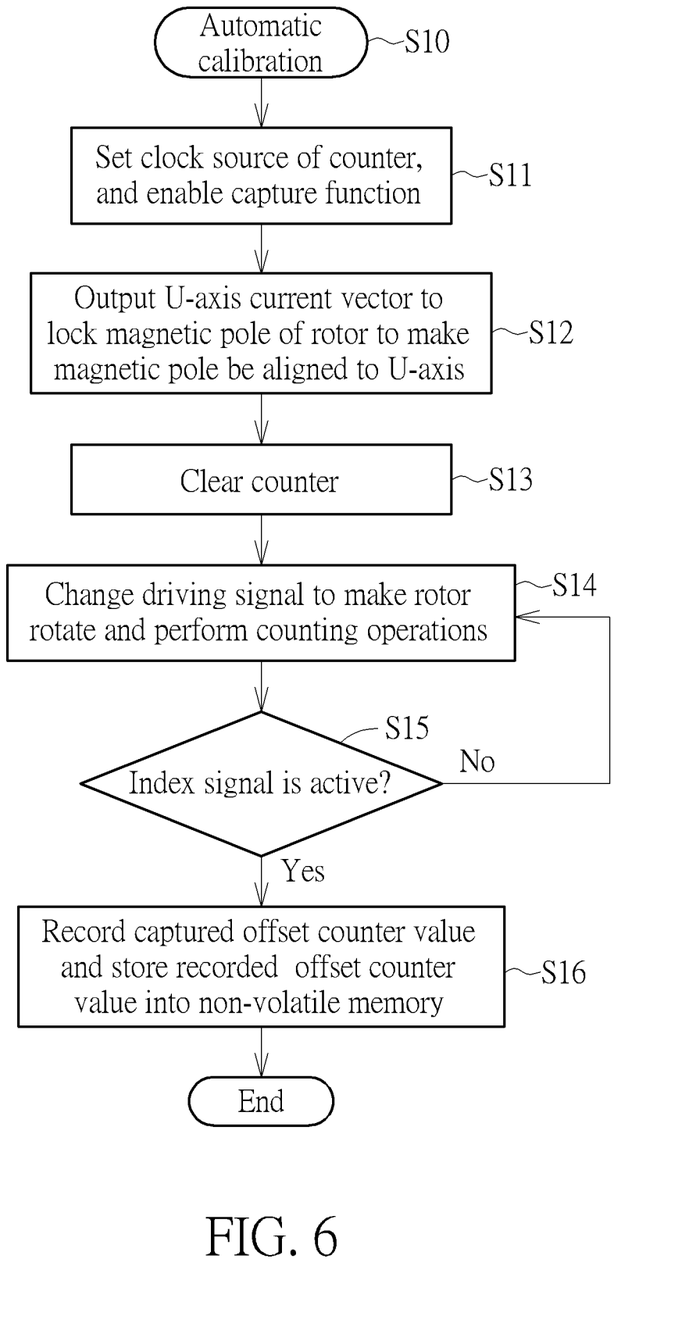
FIG. 6 illustrates a workflow of an operation method of the controller shown in FIG. 1 in the automatic calibration phase according to an embodiment of the present invention.

FIG. 6 illustrates a workflow of an operation method of the controller 110 shown in FIG. 1 in the automatic calibration phase according to an embodiment of the present invention.

In Step S10, the controller 110 may start performing automatic calibration to obtain the offset counter value.

In Step S11, the controller 110 may set the clock source of the counter 113, for example, by utilizing the quadruple frequency circuit 111 to generate the quadruple frequency signal A4 according to the output signals A and B output from the incremental encoder 122, for being input into the clock signal terminal of the counter 113 to be the clock signal thereof, and enable the capture function of the capture circuit 114 to trigger the capture function by utilizing the index signal Z input into the trigger terminal TRIG.

After performing the operation of Step S11, the circuit structure of the controller 110 is ready for performing subsequent operations. The controller 110 may perform a calibration operation to capture the counter value CNT output by the counter 113, such as the above-mentioned previous counter value CNT_PREV, as the offset counter value CNT0 according to the index signal Z, and store the offset counter value CNT0 into the non-volatile memory 119, for use in the direct start-up phase. For example, the calibration operation may comprise:

(1) utilizing the driver circuit 118 to control the driving signal DRV to be at least one first predetermined driving signal such as a U-axis current vector to make the rotor 121R be aligned to a first predetermined angle such as the angle of the U-axis, and clear any counter value of the counter 113 to be zero; and (2) starting utilizing the driver circuit 118 to change the driving signal DRV to make the rotor 121R rotate and utilizing the counter 113 to perform counting operations, until the index signal Z is active (e.g., when Z=1); but the present invention is not limited thereto. In addition, the controller 110 may utilize the capture circuit 114 to capture the above-mentioned previous counter value CNT_PREV output by the counter 113 as the offset counter value CNT0 according to the index signal Z.

In Step S12, the controller 110 may output the U-axis current vector to lock a certain magnetic pole of the rotor 121R to make this magnetic pole be aligned to the U-axis.

In Step S13, the controller 110 may clear the counter 113, and more particularly, clear any counter value CNT of the counter 113 to be zero.

In Step S14, the controller 110 may utilize the driver circuit 118 to change the driving signal DRV to make the rotor 121R rotate and utilize the counter 113 to perform counting operations.

In Step S15, the controller 110 may check whether the index signal Z is active. If Yes (e.g., Z=1), Step S16 is entered; if No (e.g., Z=0), Step S14 is entered.

In Step S16, in response to the index signal Z being active (e.g., Z=1), the controller 110 may utilize the capture circuit 114 to capture the previous counter value CNT_PREV output by the counter 113 as the offset counter value CNT0, and more particularly, utilize the register REG to record the captured offset counter value CNT0 (e.g., the offset counter value CNT0 captured by the capture circuit 114) and further store the recorded offset counter value CNT0 (e.g., the offset counter value CNT0 recorded by the register REG) into the non-volatile memory 119.

For better comprehension, the operation method may be illustrated with the working flow shown in FIG. 6, but the present invention is not limited thereto. According to some embodiments, one or more steps may be added, deleted, or changed in the working flow shown in FIG. 6.

According to some embodiments, the electric motor 121 and the incremental encoder 122 may be connected to each other during the production phase (e.g., the mass production phase) of the electric motor module 120, and the operations corresponding the automatic calibration phase in the multi-phase control (e.g., the operations in the workflow shown in FIG. 6) may be performed after the electric motor 121 and the incremental encoder 122 are connected to each other, where the automatic calibration phase may be in the production phase, but the present invention is not limited to this. For example, the production phase may be replaced by a setup phase of the electric motor module 120. For brevity, similar descriptions for these embodiments are not repeated in detail here.

Figure 7:
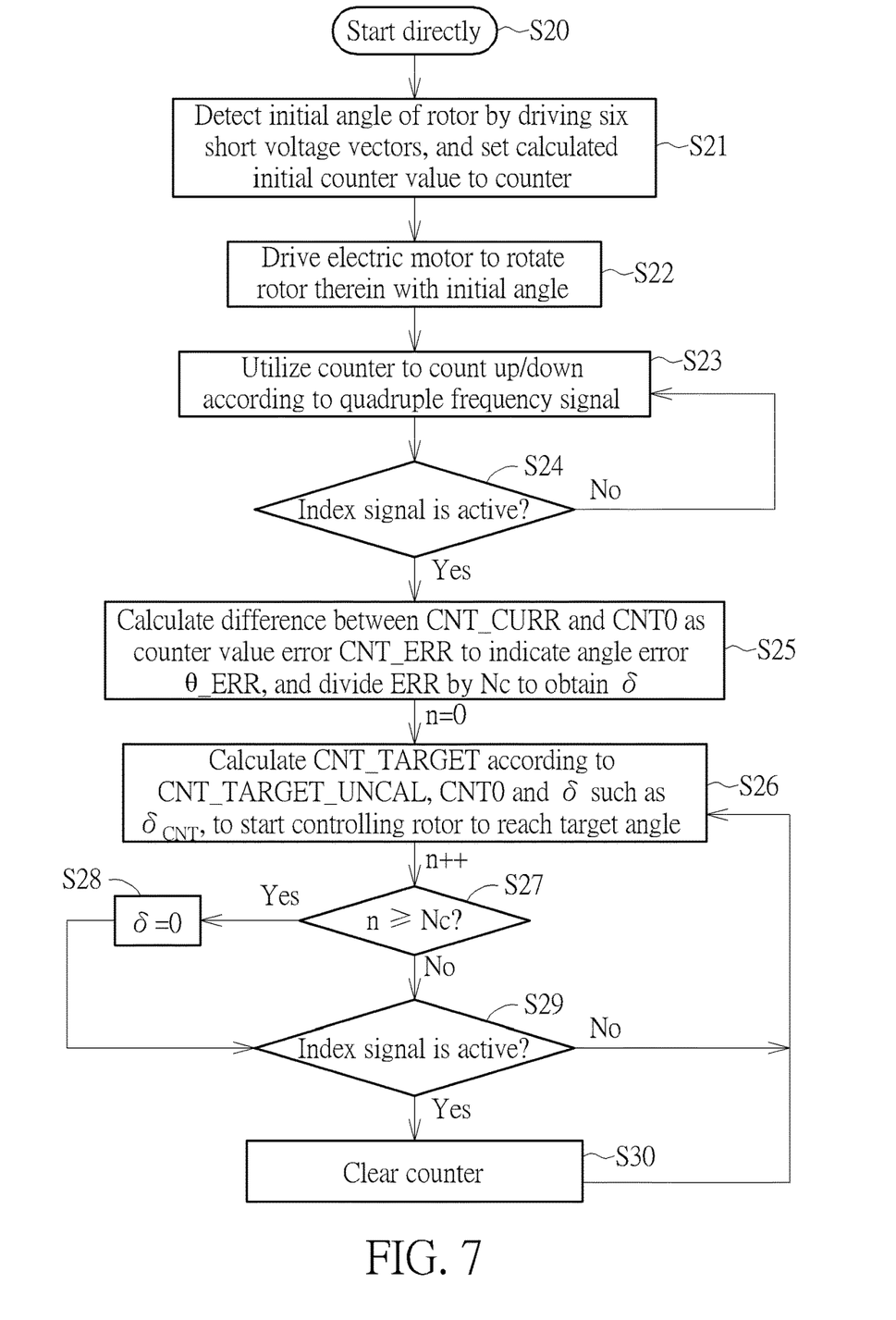
FIG. 7 illustrates a workflow of the operation method of the controller shown in FIG. 1 in the direct start-up phase according to an embodiment of the present invention.

FIG. 7 illustrates a workflow of the operation method of the controller 110 shown in FIG. 1 in the direct start-up phase according to an embodiment of the present invention.

In Step S20, the controller 110 may start controlling the electric motor module 120 equipped with the incremental encoder 122 to start directly for performing normal operations.

For example, the controller 110 may first read the offset counter value CNT0 from the non-volatile memory 119 to be ready for use, where the offset counter value CNT0 may be obtained in the automatic calibration phase, and more particularly, may be obtained from the workflow shown in FIG. 6. In addition, the controller 110 may execute an initial angle estimation procedure to obtain an estimated initial angle θ of the rotor 121R in the electric motor 121, and generate an initial counter value CNT_INIT according to the estimated initial angle θ and the offset counter value CNT0, for being written into the counter 113, and the initial angle estimation procedure mentioned above may comprise:

(1) utilizing the driver circuit 118 to control the driving signal DRV to be different pulse driving signals (e.g., six voltage pulse vectors, such as six short voltage vectors respectively corresponding to the +U axis, the +V axis, the +W axis, the −U axis, the −V axis and the −W axis) respectively to prevent rotation of the rotor 121R, and detect current values respectively corresponding to the aforementioned different pulse driving signals; and (2) calculating the estimated initial angle θ according to these current values respectively corresponding to the aforementioned different pulse driving signals (e.g., the six voltage pulse vectors such as the six short voltage vectors);

where the estimated initial angle θ may be referred to as the initial angle θ for brevity.

For better comprehension, the estimation of the initial angle θ may be regarded as the detection of the initial position of any magnetic pole (e.g., the aforementioned certain magnetic pole) of the rotor 121R, and the detection result thereof typically has an error. For example, the electric motor 121 may comprise the three-phase coils such as the coils corresponding to the three phases, and the phase difference between any two phases among the three phases may be equal to 120°. When the angle of the rotor 121R changes from a first angle to a second angle, the respective static magnetic flux values of the three-phase coils may change from a first set of static magnetic flux values to a second set of static magnetic flux values, so in different cases of applying the aforementioned different pulse driving signals (e.g., the six voltage pulse vectors such as the six short voltage vectors) to the three-phase coils respectively, the current values of the three-phase coils may be equal to different sets of current values, respectively. Therefore, the controller 110 may estimate the initial angle θ of the rotor 121R according to the current values of the three-phase coils, such as the aforementioned different sets of current values, and more particularly, utilize the driver circuit 118 to respectively inject the six voltage pulse vectors into the electric motor 121 (or the three-phase coil therein) to obtain six current vectors respectively, and calculate the current difference of the same phase to determine the relationship between the current and the angle of the rotor 121R (e.g., the relationship of the sine wave function), and perform Clarke transformation on the current differences of the three phases to obtain the current difference on two orthogonal axes, for calculating the initial angle θ of the rotor 121R by the arctangent function as follows:

$$\theta = \tan^{-1}(\Delta I_\beta / \Delta I_\alpha);$$

where the symbols "α" and "β" may respectively represent the two orthogonal axes mentioned above, wherein the α axis is aligned to the U axis and the β axis is ahead of the α axis by 90 degrees. Those skilled in the art should understand that the algorithm of the above-mentioned initial angle estimation procedure may correspond to the basic principles of electromagnetism, and the calculation of the initial angle θ may be based on the associated predetermined equations, but the present invention is not limited thereto. According to some embodiments, the algorithm of the above-mentioned initial angle estimation procedure may vary. In addition, the controller 110 may calculate the initial counter value CNT_INIT according to the initial angle θ and the offset counter value CNT0 as follows:

$$\text{CNT\_INIT} = (\theta/360°) * (P_T/\text{Pole\_pair}) - \text{CNT0};$$

where the symbol "$P_T$" may represent the pulse-per-revolution count of the quadruple frequency signal A4 generated according to the output signals A and B output from the incremental encoder 122, such as the number of pulses per revolution, and the symbol "Pole_pair" may represent a magnet/magnetic-pole-pair count such as the number of magnetic pole pairs, but the present invention is not limited thereto. When there is only a single magnetic pole pair in the rotor 121R (e.g., Pole_pair=1), the above equation may be rewritten as follows:

$$\text{CNT\_INIT} = (\theta/360°) * P_T - \text{CNT0};$$

where the magnetic pole pair shown in FIG. 4 may be taken as an example of the single magnetic pole pair in this case.

In Step S21, the controller 110 may detect the initial angle θ of the rotor 121R by respectively driving the aforementioned six voltage pulse vectors such as the six short voltage vectors (for example, driving these voltage vectors with the driver circuit 118), and set the calculated initial counter value CNT_INIT to the counter 113 (e.g., CNT=CNT_INIT).

As the angle actually used in the control may be ((CNT+CNT0)/($P_T$/Pole_pair))*360°, the initial starting angle may be θ. In Step S22, the controller 110 may start utilizing the driver circuit 118 to control the electric motor 121 to start directly with the initial angle θ, and more particularly, start driving the electric motor 121 to rotate the rotor 121R therein with the initial angle θ, where the controller 110 may simultaneously start utilizing the counter 113 to perform counting operations.

In Step S23, the controller 110 may utilize the counter 113 to count up/down according to the quadruple frequency signal A4 (which is generated by the quadruple frequency circuit 111 according to the output signals A and B output from the incremental encoder 122).

In Step S24, the controller 110 may check whether the index signal Z is active. If Yes (e.g., Z=1), Step S25 is entered; if No (e.g., Z=0), Step S23 is entered.

For example, when the index signal Z is active (e.g., Z=1), the counter value CNT of the counter 113 may be equal to a certain current counter value CNT_CURR. The controller 110 may utilize the capture circuit 114 to capture the current counter value CNT_CURR output by the counter 113 according to the index signal Z. More particularly, in response to the index signal Z being active (e.g., Z=1), the capture circuit 114 may capture the current counter value CNT_CURR output by the counter 113, and calculate the difference (CNT_CURR−CNT0) between the current counter value CNT_CURR of the counter 113 and the offset counter value CNT0 to be the counter value error CNT ERR of the initial counter value CNT_INIT (e.g., CNT ERR=CNT_CURR−CNT0), and then clear the current counter value CNT_CURR of the counter 113 to be zero, for performing subsequent counting operations, where the counter value error CNT_ERR may indicate the angle error θ_ERR of the rotor 121R. In addition, the controller 110 may perform compensation corresponding to a predetermined compensation times count Nc according to the counter value error CNT_ERR, respectively, to control the rotor 121R to reach the respective target angles of Nc rotation operations, respectively, where "Nc" may be a positive integer (e.g., Nc>1), and the predetermined compensation times count Nc may represent a predetermined number of times of compensation. For better comprehension, assuming that this compensation is performed relative to the counter value CNT, performing the compensation corresponding to the predetermined compensation times count Nc according to the counter value error CNT_ERR respectively may further comprise:

(1) calculating a counter value compensation amount $\delta_{CNT}$ according to the counter value error CNT_ERR, where the counter value compensation amount $\delta_{CNT}$ is equal to the quotient (CNT_ERR/Nc) obtained from dividing the counter value error CNT_ERR by the predetermined compensation times count Nc; and (2) during performing the compensation corresponding to the predetermined compensation times count Nc, performing compensation according to the counter value compensation amount $\delta_{CNT}$ each time, in order to control the rotor 121R to reach the target angle of said each time; but the present invention is not limited thereto. According to some embodiments, assuming that this compensation is performed relative to the angle, performing the compensation corresponding to the predetermined compensation times count Nc according to the counter value error CNT_ERR respectively may further comprise:

(1) calculating an angle compensation amount $\delta_A$ according to the counter value error CNT_ERR, where the angle compensation amount $\delta_A$ is equal to the quotient (θ_ERR/Nc) obtained from dividing the angle error θ_ERR corresponding to the counter value error CNT_ERR by the predetermined compensation times count Nc; and (2) during performing the compensation corresponding to the predetermined compensation times count Nc, performing compensation according to the angle compensation amount $\delta_A$ each time, in order to control the rotor 121R to reach the target angle of said each time;

but the present invention is not limited thereto.

In Step S25, in response to the index signal Z being active (e.g., Z=1), the controller 110 may calculate the difference between the current counter value CNT_CURR of the counter 113 and the offset counter value CNT0 as the counter value error CNT_ERR to indicate the aforementioned angle error θ_ERR, and divide at least one error ERR (e.g., one or more errors, such as the counter value error CNT_ERR and/or the angle error θ_ERR) by the predetermined compensation times count Nc to obtain at least one compensation amount δ (e.g., one or multiple compensation amounts, such as the counter value compensation amount $\delta_{CNT}$ and/or the angle compensation amount $\delta_A$), wherein after obtaining the current counter value CNT_CURR, the controller 110 may clear the current counter value CNT_CURR in the counter 113 to be zero, for performing subsequent counting operations. For example, when it is needed to perform the associated operations according to the angle error θ_ERR, the controller 110 may calculate the angle error θ_ERR according to the counter value error CNT_ERR, the pulse-per-revolution count $P_T$ and the magnetic-pole-pair count Pole_pair as shown below:

$$\theta\_ERR=(CNT\_ERR/(P_T/\text{Pole\_pair}))*360°,$$

but the present invention is not limited thereto. When there is only the single magnetic pole pair in the rotor 121R (e.g., Pole_pair=1), the above equation may be rewritten as follows:

$$\theta\_ERR=(CNT\_ERR/P_T)*360°;$$

where the magnetic pole pair shown in FIG. 4 may be taken as an example of the single magnetic pole pair in this case.

In Step S26, the controller 110 may calculate the target counter value CNT_TARGET according to the uncalibrated target counter value CNT_TARGET_UNCAL, the offset counter value CNT0 and the aforementioned at least one compensation amount δ such as the counter value compensation amount $\delta_{CNT}$, to start controlling the rotor 121R to reach the target angle of the rotation operation of this time, such as the target angle corresponding to this target counter value CNT_TARGET, and more particularly, start utilizing the driver circuit 118 to change the driving signal DRV to make the rotor 121R rotate, until the counter value CNT reaches this target counter value CNT_TARGET. For example, the controller 110 may calculate the target counter value CNT_TARGET as follows:

$$CNT\_TARGET=CNT\_TARGET\_UNCAL+CNT0+\delta_{CNT};$$

but the present invention is not limited thereto. When completing the compensation corresponding to the predetermined compensation times count Nc, the controller 110 may reset the aforementioned at least one compensation amount δ such as the counter value compensation amount $\delta_{CNT}$ to be zero. In this case, the above equation may be rewritten as follows:

$$CNT\_TARGET=CNT\_TARGET\_UNCAL+CNT0;$$

where $\delta_{CNT}=0$. In addition, the uncalibrated target counter value CNT_TARGET_UNCAL may represent the target counter value in a situation where no calibration with respect to the offset counter value CNT0 and the aforementioned at least one compensation amount δ such as the counter value compensation amount $\delta_{CNT}$ is performed. For example, the controller 110 may calculate the uncalibrated target counter value CNT_TARGET UNCAL as follows:

$$CNT\_TARGET\_UNCAL=(\theta\_TARGET/360°)*(P_T/\text{Pole\_pair});$$

where the symbol "θ TARGET" may represent the target angle of the rotation operation of this time, but the present invention is not limited thereto. When there is only the single magnetic pole pair in the rotor 121R (e.g., Pole_pair=1), the above equation may be rewritten as follows:

$$CNT\_TARGET\_UNCAL=(\theta\_TARGET/360°)*P_T;$$

where the magnetic pole pair shown in FIG. 4 may be taken as an example of the single magnetic pole pair in this case.

In Step S27, the controller 110 may check whether the compensation times index n reaches Nc. If Yes (e.g., n≥Nc), Step S28 is entered; if No (e.g., n<Nc), Step S29 is entered.

In Step S28, the controller 110 may reset δ (e.g., δ=0), and more particularly, reset $δ_{CNT}$ (e.g., $δ_{CNT}$=0).

In Step S29, the controller 110 may check whether the index signal Z is active. If Yes (e.g., Z=1), Step S30 is entered; if No (e.g., Z=0), Step S26 is entered.

In Step S30, the controller 110 may clear the counter 113, and more particularly, clear any counter value CNT of the counter 113 to be zero.

For better comprehension, the operation method may be illustrated with the workflow shown in FIG. 7, but the present invention is not limited thereto. According to some embodiments, one or more steps may be added, deleted or changed in the workflow shown in FIG. 7.

According to some embodiments, the operations corresponding to the direct start-up phase in the multi-phase control may comprise:

(1) the controller 110 may read the offset counter value CNT0 from the non-volatile memory 119, where the offset counter value CNT0 is obtained in the automatic calibration phase;

(2) the controller 110 may execute the aforementioned initial angle estimation procedure to obtain the estimated initial angle θ of the rotor 121R in the electric motor 121, generate the initial counter value CNT_INIT according to the estimated initial angle θ and the offset counter value CNT0, for being written into the counter 113, and start utilizing the driver circuit 118 to control the electric motor 121 to start directly with the estimated initial angle θ and utilizing the counter 113 to perform counting operations;

(3) in response to the index signal Z output by the incremental encoder 122 being active, the controller 110 may calculate the difference between the current counter value CNT_CURR of the counter 113 and the offset counter value CNT0 to be the counter value error CNT_ERR of the initial counter value CNT_INIT, and clear the current counter value CNT_CURR of the counter 113 to be zero; and (4) the controller 110 may perform the aforementioned compensation corresponding to the predetermined compensation times count Nc according to the counter value error CNT_ERR, respectively, in order to control the rotor 121R to reach the respective target angle {θ_TARGET(n)|n=1, 2, . . . , Nc} (e.g., the target angles {θ_TARGET(1), θ_TARGET(2), . . . , θ_TARGET(Nc)}) of the aforementioned Nc rotation operations, and more particularly, further control the rotor 121R to reach the respective target angles {θ_TARGET(n)|n=(Nc+1), (Nc+2), . . . } (e.g., the target angle {θ_TARGET(Nc+1), θ_TARGET (Nc+2), . . . }) of the subsequent rotation operations; but the present invention is not limited thereto. For brevity, similar descriptions for these embodiments are not repeated in detail here.

Figure 8:
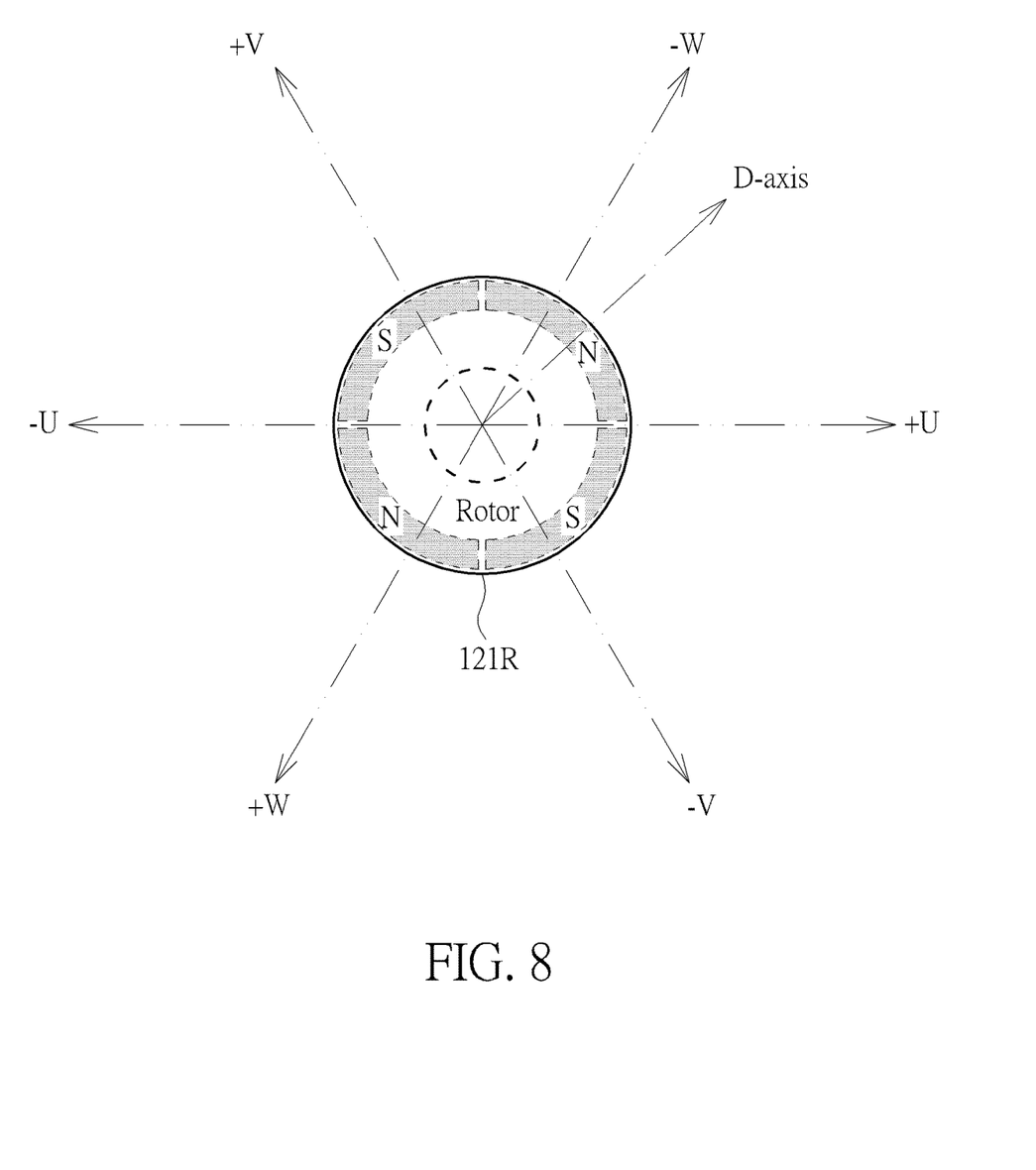
FIG. 8 illustrates associated magnetic poles of the rotor in the electric motor shown in FIG. 1 according to another embodiment of the present invention.

FIG. 8 illustrates the associated magnet/magnetic poles of the rotor 121R in the electric motor 121 shown in FIG. 1 according to another embodiment of the present invention. The rotor 121R may comprise more than one magnetic pole pair, such as multiple magnetic pole pairs formed by multiple magnetic poles N and multiple magnetic poles S as shown in FIG. 8, but the present invention is not limited thereto. For brevity, similar descriptions for this embodiment are not repeated in detail here.

Figure 9:
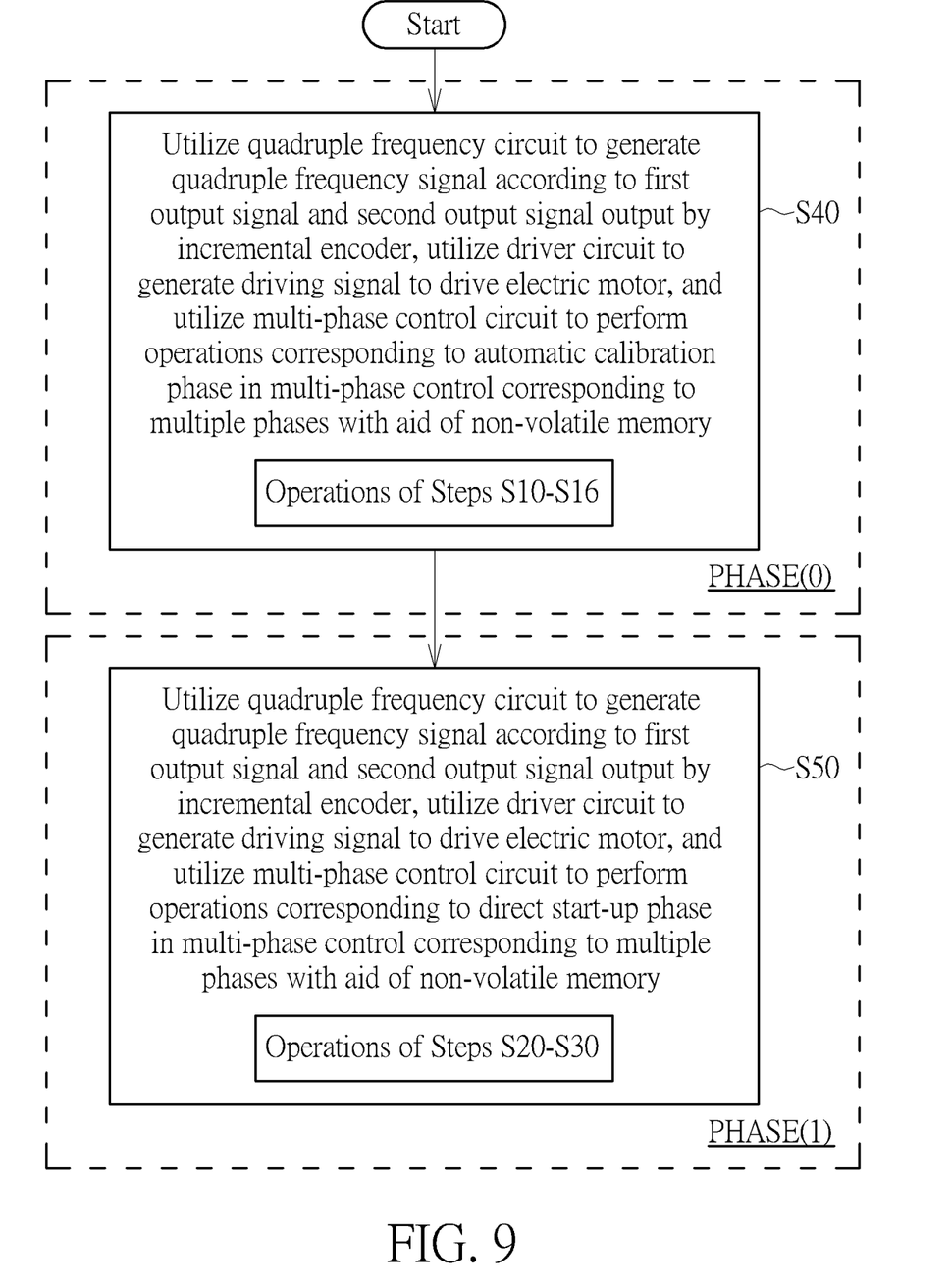
FIG. 9 illustrates a workflow of the operation method of the controller shown in FIG. 1 according to an embodiment of the present invention.

FIG. 9 illustrates a workflow of the operation method of the controller 110 shown in FIG. 1 according to an embodiment of the present invention, where the automatic calibration phase PHASE(0) and the direct start-up phase PHASE (1) shown in FIG. 9 may be taken as examples of the aforementioned automatic calibration phase and the aforementioned direct start-up phase, respectively.

In Step S40, the controller 110 may utilize the quadruple frequency circuit 111 to generate the quadruple frequency signal A4 according to the first output signal and the second output signal output by the incremental encoder 122, such as the output signals A and B, utilize the driver circuit 118 to generate the driving signal DRV to drive the electric motor 121, and utilize the multi-phase control circuit 110C to perform the operations corresponding to the automatic calibration phase in the multi-phase control corresponding to the multiple phases with the aid of the non-volatile memory 119, such as the operations of Steps S10-S16 in the workflow shown in FIG. 6.

In Step S50, the controller 110 may utilize the quadruple frequency circuit 111 to generate the quadruple frequency signal A4 according to the first output signal and the second output signal output by the incremental encoder 122, such as the output signals A and B, utilize the driver circuit 118 to generate the driving signal DRV to drive the electric motor 121, and utilize the multi-phase control circuit 110C to perform the operations corresponding to the direct start-up phase in the multi-phase control corresponding to the multiple phases with the aid of the non-volatile memory 119, such as the operations of Steps S20-S30 in the workflow shown in FIG. 7.

For better comprehension, the operation method may be illustrated with the working flow shown in FIG. 9, but the present invention is not limited thereto. According to some embodiments, one or more steps may be added, deleted, or changed in the working flow shown in FIG. 9.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A controller for controlling an electric motor module equipped with an incremental encoder, the electric motor module comprising an electric motor and the incremental encoder, the controller comprising:

a quadruple frequency circuit, coupled to the incremental encoder, arranged to generate a quadruple frequency signal according to a first output signal and a second output signal output by the incremental encoder, wherein the first output signal and the second output signal have the same frequency, and a phase difference between the first output signal and the second output signal is equal to a predetermined phase difference;

a driver circuit, coupled to the electric motor, arranged to generate at least one driving signal to drive the electric motor;

a non-volatile memory, arranged to store information; and a multi-phase control circuit, coupled to the quadruple frequency circuit, the driver circuit and the non-volatile memory, arranged to perform multi-phase control corresponding to multiple phases with aid of the non-volatile memory, wherein the multiple phases comprise an automatic calibration phase and a direct start-up phase, and the multi-phase control circuit comprises:
a counter, coupled to the quadruple frequency circuit, arranged to receive the quadruple frequency signal as a clock signal and perform counting operations according to the clock signal in the automatic calibration phase and the direct start-up phase respectively, for controlling the electric motor module;
wherein operations corresponding to the direct start-up phase in the multi-phase control comprise:
reading an offset counter value from the non-volatile memory, wherein the offset counter value is obtained in the automatic calibration phase;
executing an initial angle estimation procedure to obtain an estimated initial angle of a rotor in the electric motor, generating an initial counter value according to the estimated initial angle and the offset counter value, for being written into the counter, and starting utilizing the driver circuit to control the electric motor to directly start with the estimated initial angle and utilizing the counter to perform counting operations;
in response to an index signal output by the incremental encoder being active, calculating a difference between a current counter value of the counter and the offset counter value to be a counter value error of the initial counter value, and clearing the current counter value of the counter to be zero; and
performing compensation corresponding to a predetermined compensation times count according to the counter value error, respectively, to control the rotor to reach a target angle, wherein the predetermined compensation times count represents a predetermined number of times of compensation.

2. The controller of claim 1, wherein the electric motor and the incremental encoder are connected to each other in a production phase of the electric motor module, wherein the automatic calibration phase is in the production phase, and operations corresponding to the automatic calibration phase in the multi-phase control are performed after the electric motor and the incremental encoder are connected to each other.

3. The controller of claim 1, wherein operations corresponding to the automatic calibration phase in the multi-phase control comprise:
performing a calibration operation to capture a previous counter value output by the counter as the offset counter value according to the index signal, and storing the offset counter value into the non-volatile memory, for being used in the direct start-up phase.

4. The controller of claim 3, wherein the calibration operation comprises:
utilizing the driver circuit to control the at least one driving signal to be at least one first predetermined driving signal to make the rotor be aligned to a first predetermined angle, and clear any counter value of the counter to be zero; and
starting utilizing the driver circuit to change the at least one driving signal to make the rotor rotate and utilizing the counter to perform counting operations, until the index signal is active.

5. The controller of claim 3, wherein the multi-phase control circuit further comprises:
a capture circuit, coupled to the counter and the incremental encoder, arranged to capture the previous counter value output by the counter as the offset counter value according to the index signal.

6. The controller of claim 5, wherein in response to the index signal being active, the capture circuit captures the previous counter value output by the counter as the offset counter value.

7. The controller of claim 1, wherein the initial angle estimation procedure comprises:
utilizing the driver circuit to respectively generate pulse driving signals having different voltage pulse vectors to prevent the rotor from rotating, and detect current values respectively corresponding to the different pulse driving signals; and
calculating the estimated initial angle according to the current values respectively corresponding to the different pulse driving signals.

8. The controller of claim 1, wherein the multi-phase control circuit further comprises:
a capture circuit, coupled to the counter and the incremental encoder, arranged to capture the current counter value output by the counter according to the index signal, wherein, in response to the index signal being active, the capture circuit captures the current counter value output by the counter.

9. The controller of claim 1, wherein performing the compensation corresponding to the predetermined compensation times count according to the counter value error respectively further comprises:
calculating a counter value compensation amount according to the counter value error, wherein the counter value compensation amount is equal to a quotient obtained from dividing the counter value error by the predetermined compensation times count; and
during performing the compensation corresponding to the predetermined compensation times count, performing compensation according to the counter value compensation amount each time, in order to control the rotor to reach the target angle of said each time.

10. The controller of claim 1, wherein performing the compensation corresponding to the predetermined compensation times count according to the counter value error respectively further comprises:
calculating an angle compensation amount according to the counter value error, wherein the angle compensation amount is equal to a quotient obtained from dividing an angle error corresponding to the counter value error by the predetermined compensation times count; and
during performing the compensation corresponding to the predetermined compensation times count, performing compensation according to the angle compensation amount each time, in order to control the rotor to reach the target angle of said each time.

11. An operation method of a controller for controlling an electric motor module equipped with an incremental encoder, the electric motor module comprising an electric motor and the incremental encoder, the operation method comprising:
utilizing a quadruple frequency circuit to generate a quadruple frequency signal according to a first output signal and a second output signal output by the incremental encoder, wherein the first output signal and the second output signal have the same frequency, and a phase difference between the first output signal and the second output signal is equal to a predetermined phase difference;
utilizing a driver circuit to generate at least one driving signal to drive the electric motor; and utilizing a multi-phase control circuit to perform multi-phase control corresponding to multiple phases with aid of a non-volatile memory, wherein the multiple phases comprise an automatic calibration phase and a direct start-up phase, and a counter in the multi-phase control circuit is arranged to receive the quadruple frequency signal as a clock signal and perform counting operations according to the clock signal in the automatic calibration phase and the direct start-up phase respectively, for controlling the electric motor module;

wherein operations corresponding to the direct start-up phase in the multi-phase control comprise:

reading an offset counter value from the non-volatile memory, wherein the offset counter value is obtained in the automatic calibration phase;

executing an initial angle estimation procedure to obtain an estimated initial angle of a rotor in the electric motor, generating an initial counter value according to the estimated initial angle and the offset counter value, for being written into the counter, and starting utilizing the driver circuit to control the electric motor to directly start with the estimated initial angle and utilizing the counter to perform counting operations;

in response to an index signal output by the incremental encoder being active, calculating a difference between a current counter value of the counter and the offset counter value to be a counter value error of the initial counter value, and clearing the current counter value of the counter to be zero; and performing compensation corresponding to a predetermined compensation times count according to the counter value error, respectively, to control the rotor to reach a target angle, wherein the predetermined compensation times count represents a predetermined number of times of compensation.

12. The operation method of claim 11, wherein the electric motor and the incremental encoder are connected to each other in a production phase of the electric motor module, wherein the automatic calibration phase is in the production phase, and operations corresponding to the automatic calibration phase in the multi-phase control are performed after the electric motor and the incremental encoder are connected to each other.

13. The operation method of claim 11, wherein operations corresponding to the automatic calibration phase in the multi-phase control comprise:

performing a calibration operation to capture a previous counter value output by the counter as the offset counter value according to the index signal, and storing the offset counter value into the non-volatile memory, for being used in the direct start-up phase.

14. The operation method of claim 13, wherein the calibration operation comprises:

utilizing the driver circuit to control the at least one driving signal to be at least one first predetermined driving signal to make the rotor be aligned to a first predetermined angle, and clear any counter value of the counter to be zero; and starting utilizing the driver circuit to change the at least one driving signal to make the rotor rotate and utilizing the counter to perform counting operations, until the index signal is active.

15. The operation method of claim 13, wherein capturing the previous counter value output by the counter as the offset counter value according to the index signal further comprises:

utilizing a capture circuit in the multi-phase control circuit to capture the previous counter value output by the counter as the offset counter value according to the index signal.

16. The operation method of claim 15, wherein in response to the index signal being active, the capture circuit captures the previous counter value output by the counter as the offset counter value.

17. The operation method of claim 11, wherein the initial angle estimation procedure comprises:

utilizing the driver circuit to respectively generate pulse driving signals having different voltage pulse vectors to prevent the rotor from rotating, and detect current values respectively corresponding to the different pulse driving signals; and calculating the estimated initial angle according to the current values respectively corresponding to the different pulse driving signals.

18. The operation method of claim 11, further comprising:

utilizing a capture circuit in the multi-phase control circuit to capture the current counter value output by the counter according to the index signal, wherein, in response to the index signal being active, the capture circuit captures the current counter value output by the counter.

19. The operation method of claim 11, wherein performing the compensation corresponding to the predetermined compensation times count according to the counter value error respectively further comprises:

calculating a counter value compensation amount according to the counter value error, wherein the counter value compensation amount is equal to a quotient obtained from dividing the counter value error by the predetermined compensation times count; and during performing the compensation corresponding to the predetermined compensation times count, performing compensation according to the counter value compensation amount each time, in order to control the rotor to reach the target angle of said each time.

20. The operation method of claim 11, wherein performing the compensation corresponding to the predetermined compensation times count according to the counter value error respectively further comprises:

calculating an angle compensation amount according to the counter value error, wherein the angle compensation amount is equal to a quotient obtained from dividing an angle error corresponding to the counter value error by the predetermined compensation times count; and during performing the compensation corresponding to the predetermined compensation times count, performing compensation according to the angle compensation amount each time, in order to control the rotor to reach the target angle of said each time.

\* \* \* \* \*